United States Patent
Torgerson

(10) Patent No.: US 7,555,731 B2
(45) Date of Patent: *Jun. 30, 2009

(54) SYSTEM AND METHOD OF NAVIGATING AND CREATING ELECTRONIC HIERARCHICAL DOCUMENTS

(75) Inventor: Jay Ryan Torgerson, Hopkinton, MA (US)

(73) Assignee: The Math Works, Inc., Natick, MA (US)

( * ) Notice: Subject to any disclaimer, the term of this patent is extended or adjusted under 35 U.S.C. 154(b) by 563 days.

This patent is subject to a terminal disclaimer.

(21) Appl. No.: 11/359,342

(22) Filed: Feb. 22, 2006

(65) Prior Publication Data

US 2006/0143579 A1  Jun. 29, 2006

Related U.S. Application Data

(63) Continuation of application No. 09/858,141, filed on May 14, 2001, now Pat. No. 7,010,744.

(51) Int. Cl.
*G06F 17/00* (2006.01)
(52) U.S. Cl. .................. 715/854; 715/215; 715/245
(58) Field of Classification Search ............ 715/854, 715/245, 215
See application file for complete search history.

(56) References Cited

U.S. PATENT DOCUMENTS

| | | | | |
|---|---|---|---|---|
| 4,819,189 A | * | 4/1989 | Kikuchi et al. | 715/797 |
| 5,801,958 A | * | 9/1998 | Dangelo et al. | 716/18 |
| 6,256,028 B1 | * | 7/2001 | Sanford et al. | 715/841 |
| 6,704,029 B1 | * | 3/2004 | Ikeda et al. | 715/723 |
| 6,754,885 B1 | * | 6/2004 | Dardinski et al. | 717/113 |
| 7,099,809 B2 | * | 8/2006 | Dori | 703/6 |
| 2001/0028369 A1 | * | 10/2001 | Gallo et al. | 345/848 |
| 2001/0030667 A1 | * | 10/2001 | Kelts | 345/854 |

OTHER PUBLICATIONS

Krus, Mike, et al, "Levels of Detail and Polygonal Simplification", Crossroads, vol. 3, Issue 4, May 1997, pp. 1-20.*

* cited by examiner

*Primary Examiner*—Laurie Ries
(74) *Attorney, Agent, or Firm*—Lahive & Cockfield, LLP; Kevin J. Canning

(57) ABSTRACT

A method of navigating and creating hierarchical documents is disclosed. The illustrative embodiments of the present invention enable a user to navigate quickly through multiple levels and sub-levels of hierarchichal documents without having to manually change the displayed view. Additionally, the method enables a user to create connections between objects in different levels and sub-levels of hierarchical documents without manually changing the view. A user is able to start connections on one level and continue the connection into a sub-level that was initially hidden or collapsed without stopping.

25 Claims, 9 Drawing Sheets

FIGURE 1
(prior art)
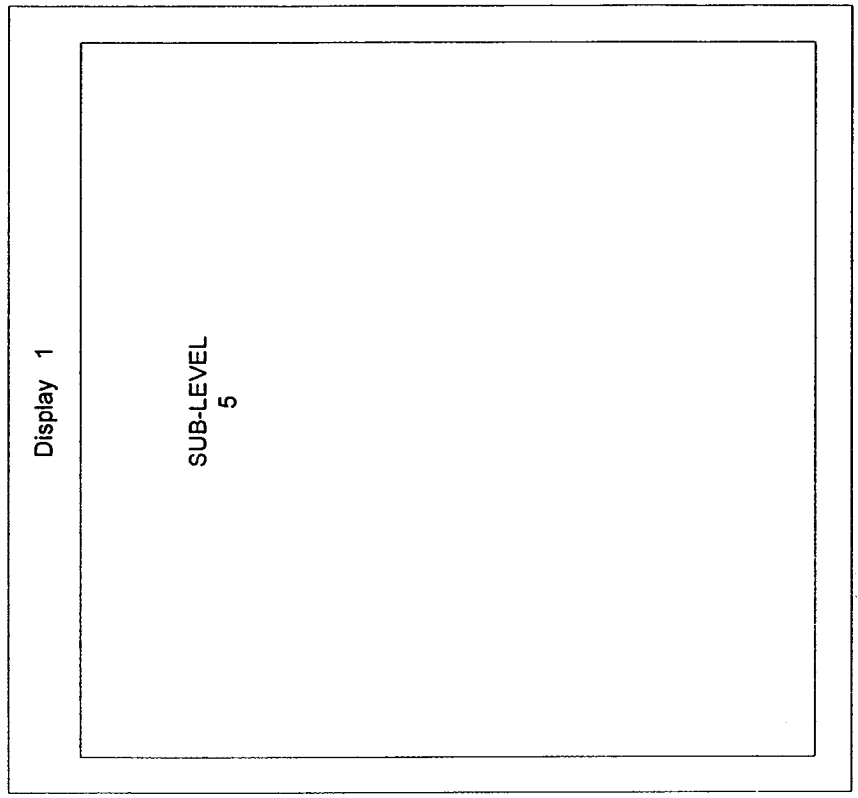
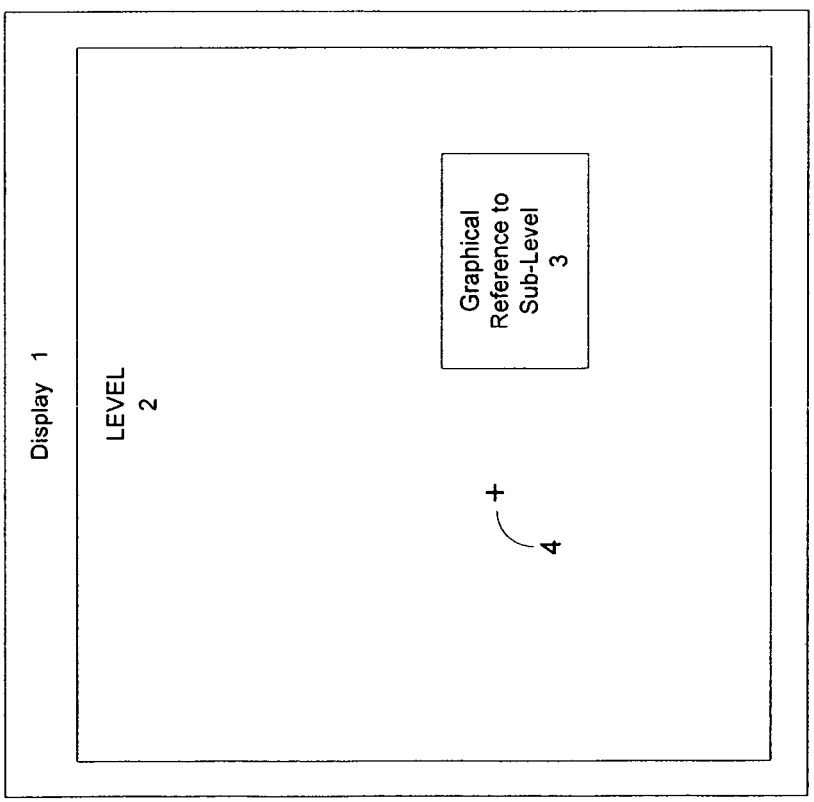

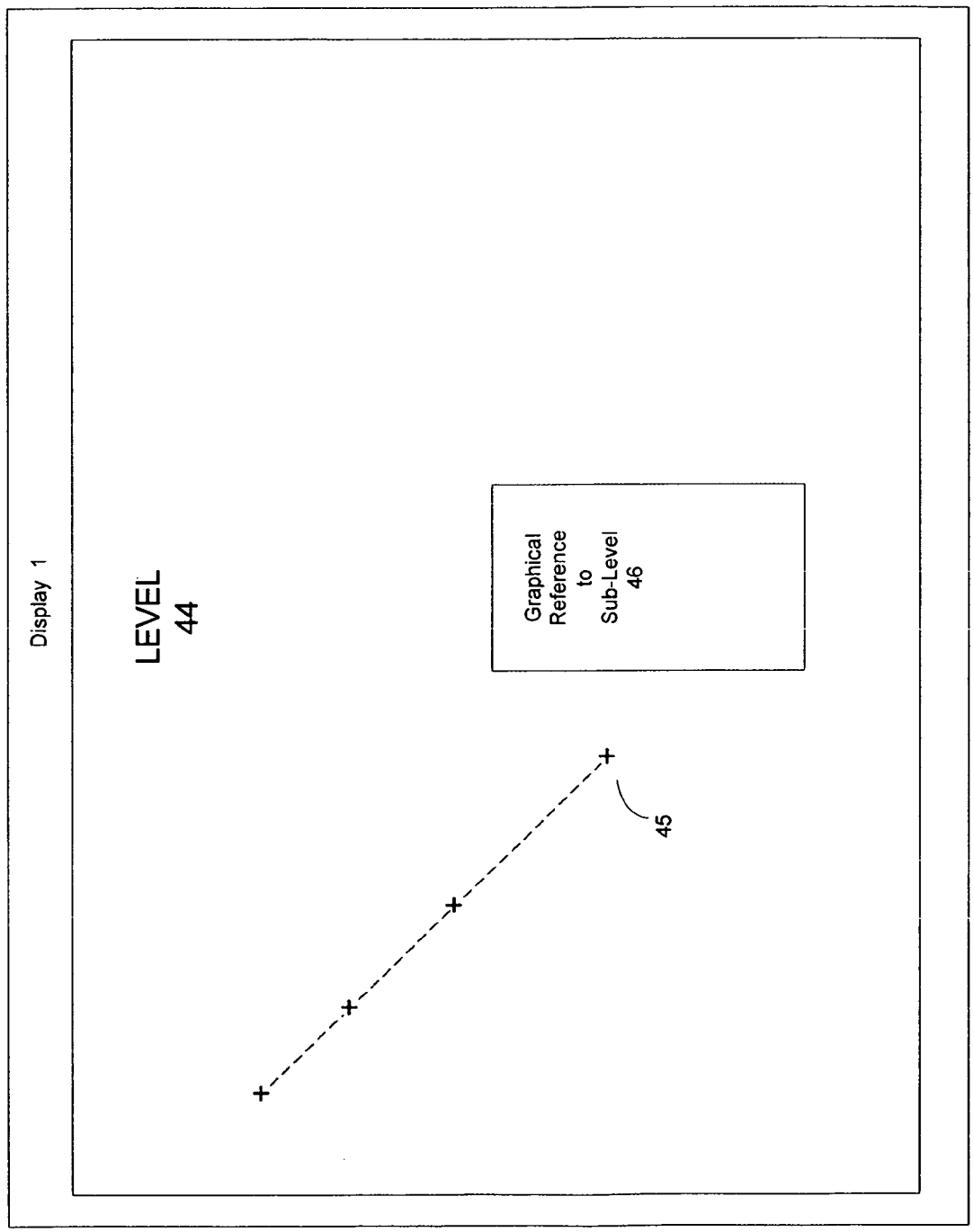

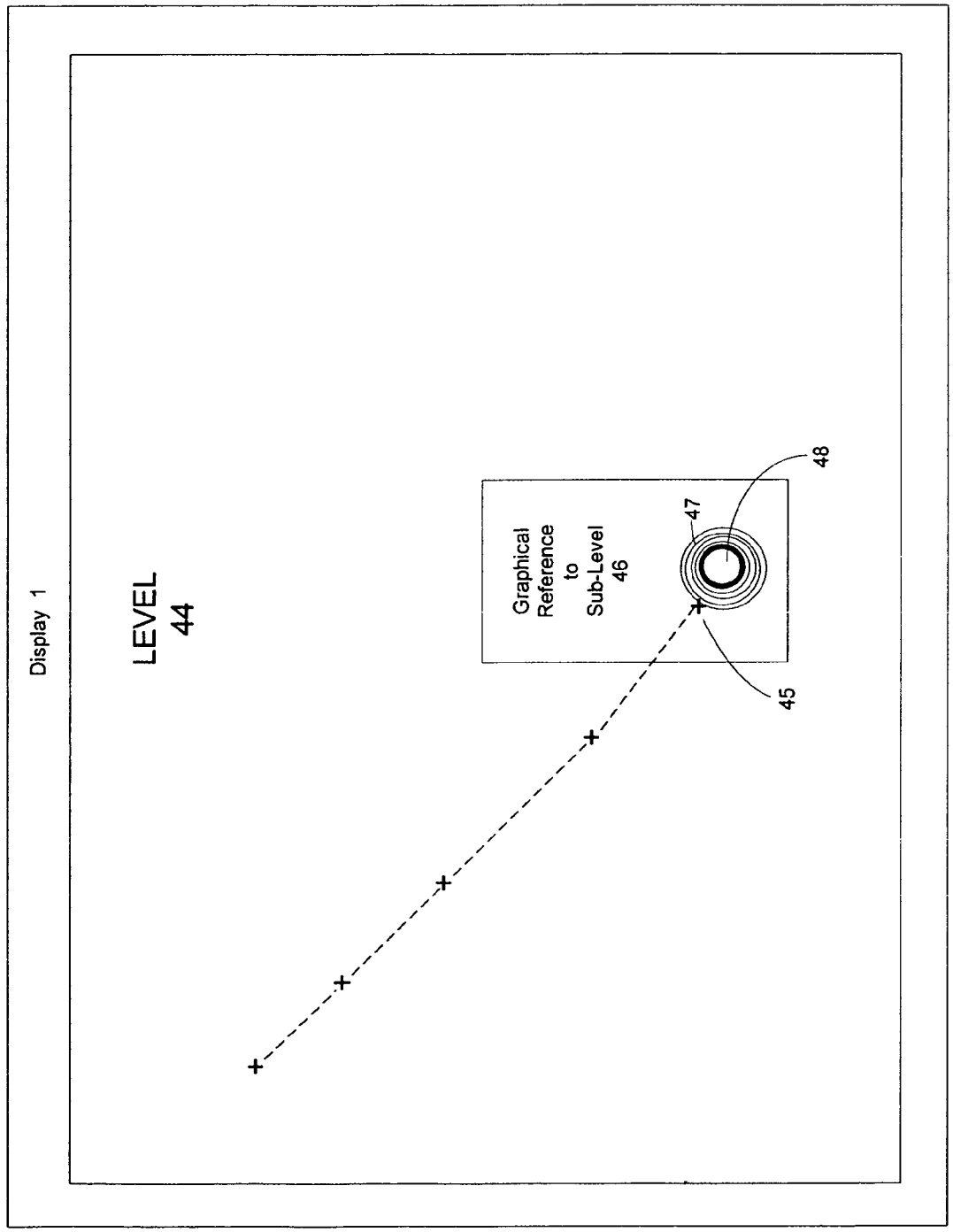

SYSTEM AND METHOD OF NAVIGATING AND CREATING ELECTRONIC HIERARCHICAL DOCUMENTS

RELATED APPLICATION

This patent application is a continuation application of, and claims the benefit of, U.S. patent application Ser. No. 09/858,141 filed on May 14, 2001, entitled "A SYSTEM AND METHOD OF NAVIGATING AND CREATING ELECTRONIC HIERARCHICAL DOCUMENTS".

FIELD OF THE INVENTION

The illustrative embodiment of the present invention relates generally to the field of navigating and creating electronic documents, and more particularly to the navigation and creation of electronic hierarchical documents.

BACKGROUND OF THE INVENTION

Hierarchical diagrams are diagrams, such as block diagrams, which are divisible into levels and further divisible into sub-levels associated with the levels. A user viewing a hierarchical diagram on an electronic device usually views a single active level or sub-level at a time. For example, a user initially viewing a hierarchical diagram on an electronic device may see the only the top level. The displayed level may contain a graphical reference to a sub-level, but the sub-level contents are not initially displayed. The conventional method of accessing the sub-level of the hierarchical diagram requires the user to manipulate a pointing device, such as a mouse, so that a cursor appearing in the display travels to a graphical representation of the sub-level. The user is then required to click or double-click on the graphical representation in order to change the view on the display to the view of the sub-level contents. The conventional process requires the user to continually stop and then restart the mouse or other pointing device when changing displayed levels.

Many applications, such as block diagram editors, allow a user of an electronic device to draw graphical connections between levels and associated sub-levels. Traditionally, this has been done with a block diagram editor by drawing a connection from a first block displayed in a level to a block which is a graphical representation of a sub-level, often with the aid of a user-manipulated pointing device. Once the line drawn by the user reaches the graphical representation of the sub-level, the user is required to discontinue drawing the line in order to access the sub-level contents by clicking or double clicking on the graphical representation of the sub-level to display the contents of the sub-level. After the sub-level contents are displayed the user may then start drawing the connection again. In order to restart the connection drawing process however, the user is faced with the task of connecting the line the user was drawing at the previously displayed level with the line in the sub-level contents that were just displayed. The conventional process requires the user to interrupt the drawing of connections in order to switch levels and further requires the user to manually join the connection line of the sub-level with the connection line drawn for the level.

FIG. 1 depicts a prior art arrangement where a display 1 displays a level 2 of a hierarchical diagram to a user of an electronic device. The displayed level 2 includes a graphical reference to a sub-level 3 and a cursor icon 4 which moves about the display 1 in response to user movements of a pointing device. Those skilled in the art will appreciate that a keyboard or keypad, instead of or as well as a pointing device, may be used to manipulate the cursor in some embodiments. The conventional methods of changing the view in the display 1 from the level 2 of the hierarchical diagram to an associated sub-level 5 involves the user manipulating the cursor 4 to a superimposed position over the graphical reference to the sub-level 3 and manipulating the pointing device to select the graphical reference to the sub-level. For example, if the pointing device is a mouse, the user clicks or double-clicks the mouse. Following the clicks of the pointing device, the sub-level 5 is displayed on the display 1.

FIG. 2 depicts a display 1 that has locations that are identified by a coordinate system that includes X coordinates 8 and Y coordinates 9. Two cursor positions 10 and 11, also appear on the display 1. The locations of items which appear on the display 1 may be expressed in these screen coordinates. The coordinates are logical units which are translated pursuant to the mapping mode being utilized by the operating system of the electronic device interfaced with the display. For example, the Windows™ operating system from Microsoft Corporation of Redmond, Wash. has numerous mapping modes including MM_TEXT which uses the orientation depicted in FIG. 3 with a point of origin in the upper left corner of the display. In the MM_TEXT mapping mode, X coordinates 8 increase from left to right and Y coordinates 9 increase from top to bottom as indicated. Thus the cursor postion would be expressed in terms of coordinates (x, y). The cursor coordinates represent a cursor "hot spot" which is a small portion of the total cursor. In the case of the depicted cross type cursor at cursor position 10, the coordinates from the center of the cross would be used to calculate the cursor position on the display 1. The cursor position 10 may have coordinates (125, 20) while the cursor position 11 may have coordinates (20, 125). Other mapping modes assign values to the coordinate axes in different manners. For example, in another Windows™ mapping mode, MM_LOMETRIC, the X coordinates 8 increase in value from left to right, but the Y coordinates 9 decrease in value from top to bottom. Other mapping modes use other orientations for X coordinates 8 and the Y coordinates 9, including allowing them to be user-defined. In the MM_TEXT mapping mode, one coordinate value equals one pixel width of the display. The actual size of the pixel depends upon the screen resolution being employed. However, other mapping modes translate the logical units into set distances, such as 0.1 mm (MM_LOMETRIC) or 0.01 inches (MM_LOENGLISH).

The coordinates of a cursor appearing on the display 1 have an assigned X coordinate value and an assigned Y coordinate value. As the user moves the cursor by manipulating the pointing device, messages are generated that report the new position of the cursor in x, y coordinates. The operating system 15 uses the coordinates contained in the messages to update the display 1 being shown to the user by redrawing the position of the cursor. The operating system 15 also keeps track of other objects appearing in the display 1 so that the display of those objects can be updated to take into account the movement of the cursor. For example, if a cursor has moved, the new position of the cursor is shown in the display. If the cursor position is within an area in the display 1 already recorded as holding a displayed object, the cursor is redrawn in a superimposed position on top of the object. The coordinates detailing the location of the cursor are available to applications which register a request with the operating system.

SUMMARY OF THE INVENTION

In an embodiment an electronic device includes a medium holding computer-executable instructions for a method of navigating a hierarchical diagram, said electronic device interfaced with a display, said hierarchical diagram including levels and associated sub-levels, said method, comprising the steps of displaying a first view of said hierarchical diagram to a user of said electronic device on said display, said first view representing a level of said hierarchical diagram, said level including a graphical reference to one of said sub-levels associated with the level represented by said first; traversing said first view of said hierarchical diagram with a user operated pointing device interfaced with said electronic device, said pointing device inserting a cursor in said first view, said cursor moving in a synchronized manner with user-initiated movements of said pointing device; and manipulating said pointing device so that said cursor in said first view enters an active region located within said graphical reference to a sub-level, said active region comprising a portion of said graphical reference wherein said cursor movement automatically triggers replacement of said first view with said second view in said display said first view being replaced in said display by a second view representing said sub-level upon said cursor reaching said active region, said cursor appearing in said second view.

In another embodiment, an electronic device includes a medium holding computer-executable instructions for a method of constructing a hierarchical diagram, said electronic device interfaced with a display, said hierarchical diagram including levels and associated sub-levels, said methods, comprising the steps of displaying a first view of said hierarchical diagram to a user of said electronic device on said display, said first view representing a level of said hierarchical diagram, said level including graphical objects, said graphical objects including a graphical reference to one of said sub-levels associated with the level represented in said first view, said graphical reference including an active region wherein said cursor movement triggers replacement in said display of said displayed view; traversing said first view of said hierarchical diagram with a user operated pointing device interfaced with said electronic device, said pointing device placing a cursor in said first view, said cursor moving in a synchronized manner with user-initiated movements of said pointing device; said user initiated movements creating connections between objects in said displayed level, said connections duplicating the path of travel of said cursor; and manipulating said pointing device so that said cursor and said connection in said first view enter into an active region located within said graphical reference to a sub-level, said active region comprising a portion of said graphical reference wherein said cursor movement automatically triggers replacement of said first view with said second view in said display, said first view being replaced in said display by a second view representing said sub-level upon said cursor reaching said active region, said cursor and said connection appearing in said second view.

In another embodiment, an electronic device includes a medium holding computer-executable instructions for a method of constructing a hierarchical block diagram, and electronic device interfaced with a display, said hierarchical block diagram including levels and associated sublevels, said method, comprising the steps of displaying a first view of said hierarchical block diagram to a user of said electronic device on said display, said first view representing a level of said hierarchical block diagram, said level including graphical objects, said graphical objects including a graphical reference to one of said sub-levels associated with the level represented in said first view, said graphical reference including an active region wherein said cursor movements triggers replacement in said display of said displayed view; traversing said first view of said hierarchical block diagram with a user-operated pointing device interfaced with said electronic device, said pointing device placing a cursor in said first view, said cursor moving in a synchronized manner with user-initiated movements of said pointing device; said user-initiated movements creating connections between objects in said displayed levels, said connections duplicating the path of travel of said cursor; manipulating said pointing device so that said cursor and said connection in said first view enter into an active region located within said graphical reference to a sub-level, said active region comprising a portion of said graphical reference wherein said cursor movement automatically triggers replacement of said first view with said second view in said display, said first view being replaced in said display by a second view representing said sub-level upon said cursor reaching said active region, said cursor and said connection appearing in said second view.

In one embodiment of the present invention, a display interfaced with an electronic device displays a first view of a hierarchical diagram to a user of an electronic device. The first view corresponds to a first level in the hierarchical diagram. The first view contains a graphical reference to an associated sub-level. A pointing device, such as a mouse, is also interfaced with the electronic device, and a cursor associated with the pointing device is displayed on the display. By manipulating the pointing device such that the cursor on the display travels to and overlaps the graphical reference to the sub-level, the first view corresponding to the level is automatically replaced by a second view corresponding to the sub-level. The replacement occurs upon the cursor reaching a designated spot in the graphical reference to the sub-level.

In another embodiment of the present invention a display interfaced with an electronic device displays a first view of a hierarchical diagram to a user of an electronic device. The first view corresponds to a first level in the hierarchical diagram. The first view contains a graphical reference to an associated sub-level. A pointing device, such as a mouse, is also interfaced with the electronic device, and a cursor associated with the pointing device is displayed on the display. The user of the pointing device is able to draw connections, such as lines, between various features in the level and draw connections from the level features to features in the sub-level. The user-created connection appears in the display following the path of the cursor. When the cursor reaches a designated area of the graphical reference to the sub-level, the user drawn connection continues into the graphical sub-reference and reappears in a second view of the sub-level. The pointing device is thus able to draw one continuous connection from a displayed level to a referenced sub-level which is not initially displayed.

SUMMARY OF THE DRAWINGS

FIG. 1 (prior art) is a block diagram of traditional components used to display levels and associated sub-levels in hierarchical diagrams;

FIG. 6A is a block diagram of an embodiment of the present invention containing a graphical reference to a sub-level;

FIG. 6C depicts the block diagram of FIG. 6B with an expanded wormhole due to the proximity of the cursor.

DETAILED DESCRIPTION OF THE INVENTION

The illustrative embodiment of the present invention enables continuous navigation between levels and sub-levels of a hierarchical diagram. A user of an electronic device displaying a hierarchical diagram is not required to click graphical references to sub-levels, but rather is able to continuously move from one level to the corresponding sub-level and vice-versa with the view switching automatically. Additionally, an embodiment of the present invention enables a user of an electronic device displaying a hierarchical diagram to draw continuous connections from a level of the hierarchical diagram to a sub-level of the hierarchical diagram even though the sub-level is not initially displayed to the user by the electronic device.

Figure 2:
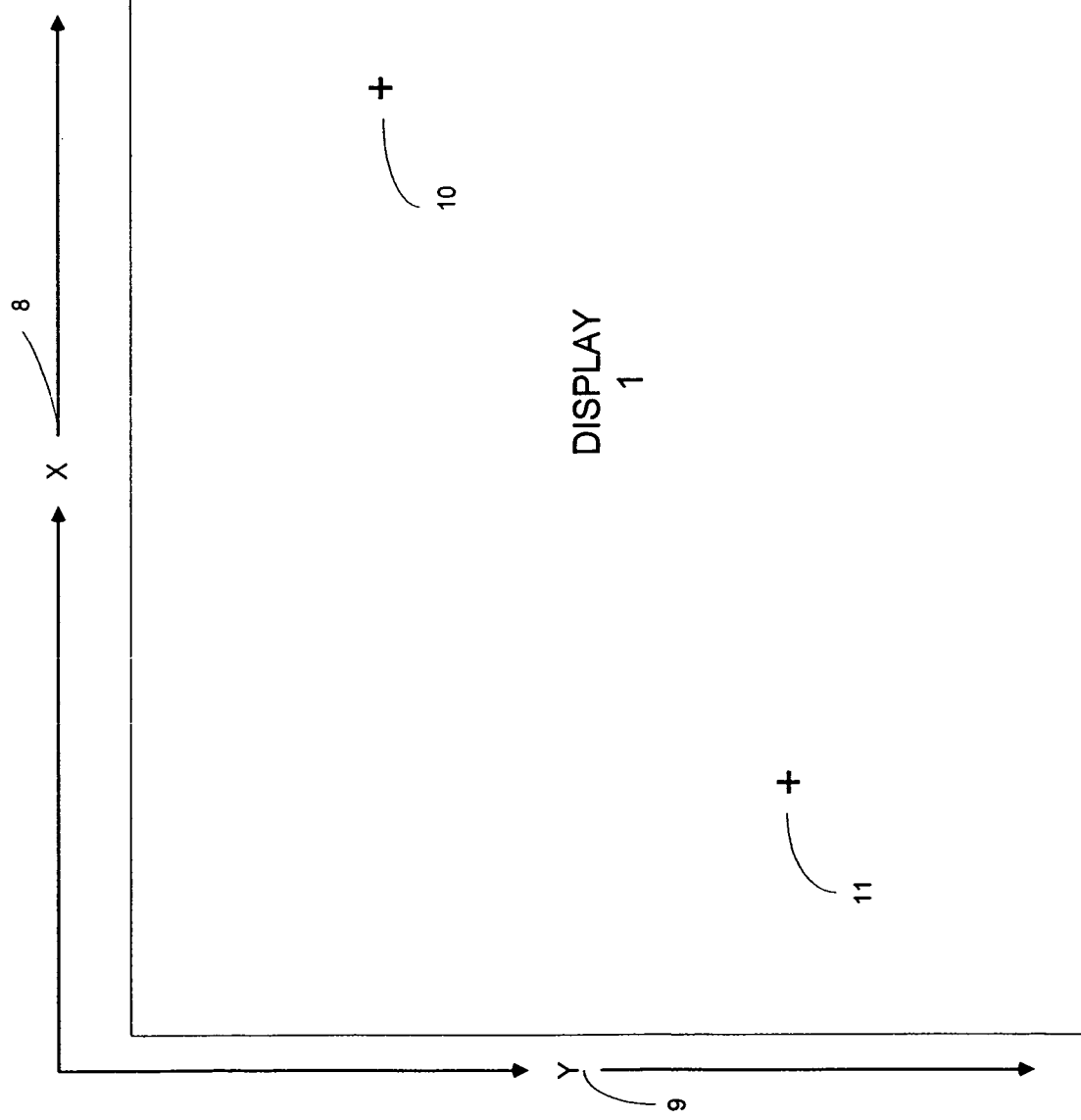
FIG. 2 (prior art) is a block diagram of a display containing display coordinates.
Figure 3:
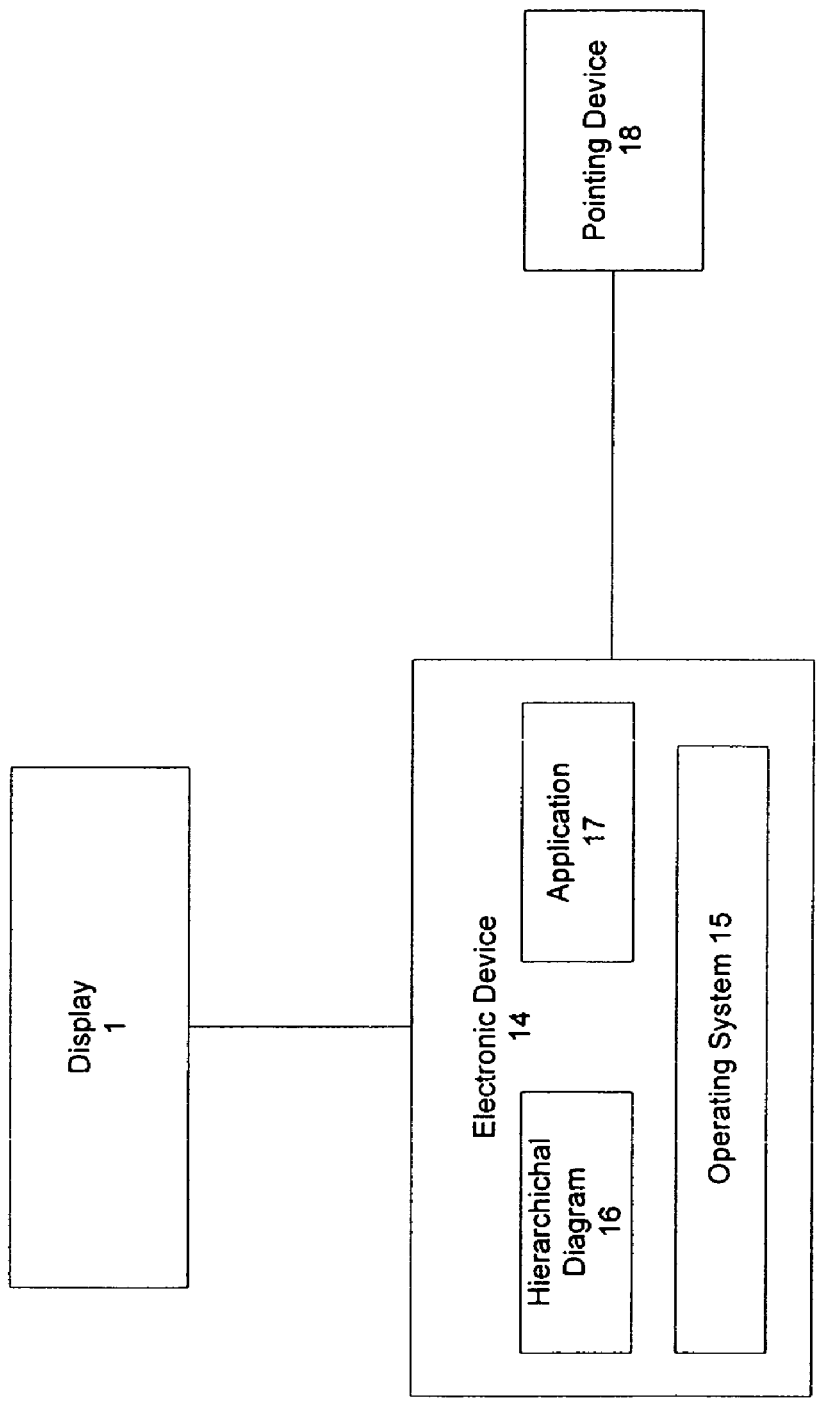
FIG. 3 is a block diagram of an environment suitable for practicing an illustrative embodiment of the present invention.

The display may be integrated with an electronic device or may be part of separate stand-alone devices. FIG. 3 depicts an environment suitable for practicing an illustrative embodiment of the present invention. A display 1 and a pointing device 18, such as a mouse, are interfaced with an electronic device 14. The electronic device 14 includes an operating system 15, a hierarchical diagram 16, and applications 17, such as Stateflow and Simulink running on top of Matlab (Stateflow, Simulink and Matlab are all from Mathworks, of Natick, Mass.). The applications 17 are used to display the hierarchical diagram 16 on the display 1 to a user.

As mentioned above, the illustrative embodiment provides a method of navigating between levels of a hierarchical diagram 16. Initially, a level of a hierarchical diagram, such as a level in a block diagram created with a block diagram editor, is displayed to a user of an electronic device 2. The level includes a graphical reference to a sub-level. The graphical reference may be, for example, an icon or other distinctive shape. A cursor also appears in the display 1 superimposed on the displayed level of the hierarchical diagram. A request is registered with the operating system 15 to report the display coordinates of the cursor. When the user manipulates the pointing device 18, a stream of messages reporting the cursor coordinates are generated by the operating system 15 and cross-referenced against the recorded coordinates of the graphical reference to the sub-level. When the cursor coordinates overlap with the coordinates recorded for the graphical reference to the sub-level, the view displayed on the display 1 is switched from the first view of the level of the hierarchical diagram to a second view of the contents of the sub-level of the hierarchical diagram associated with the level displayed in the first view. The area circumscribed by the recorded coordinates for the graphical reference to the sub-level is referred to hereafter as the "active region", examples of which will be discussed below. In another embodiment, the active region of the graphical reference to the sub-level corresponds to an area comprising less than the whole area of the graphical reference to the sub-level. In other words, the active region may be a portion of the graphical reference to the sub-level, such as the middle of the graphical reference to the sub-level. The second view that includes the contents of the sub-level also includes a graphical reference to the level displayed in the first view. The graphical reference to the level includes an active region which operates to switch the view on the display 1 back to the first view in the manner described above. The second view of the sub-level may also include graphical references to additional sub-levels of the sub-level including active regions which operate to switch the view on the display to the sub-levels of the sub-level in the same manner as previously described.

While the illustrative embodiment has been described with regard to a block diagram, those skilled in the art will recognize that the method described herein is applicable to many types of hierarchical documents capable of having levels and sub-levels such as flow charts, state diagrams, block diagrams, and other documents with embedded references to dependent documents. Though the Windows™ operating system has been used for purposes of illustration, the method of the present invention is equally applicable to other operating systems capable of providing graphical user interfaces such as the different Macintosh™ operating systems, and the different releases of the UNIX and LINUX operating systems when they are operating with a graphical user interface.

Figure 4:
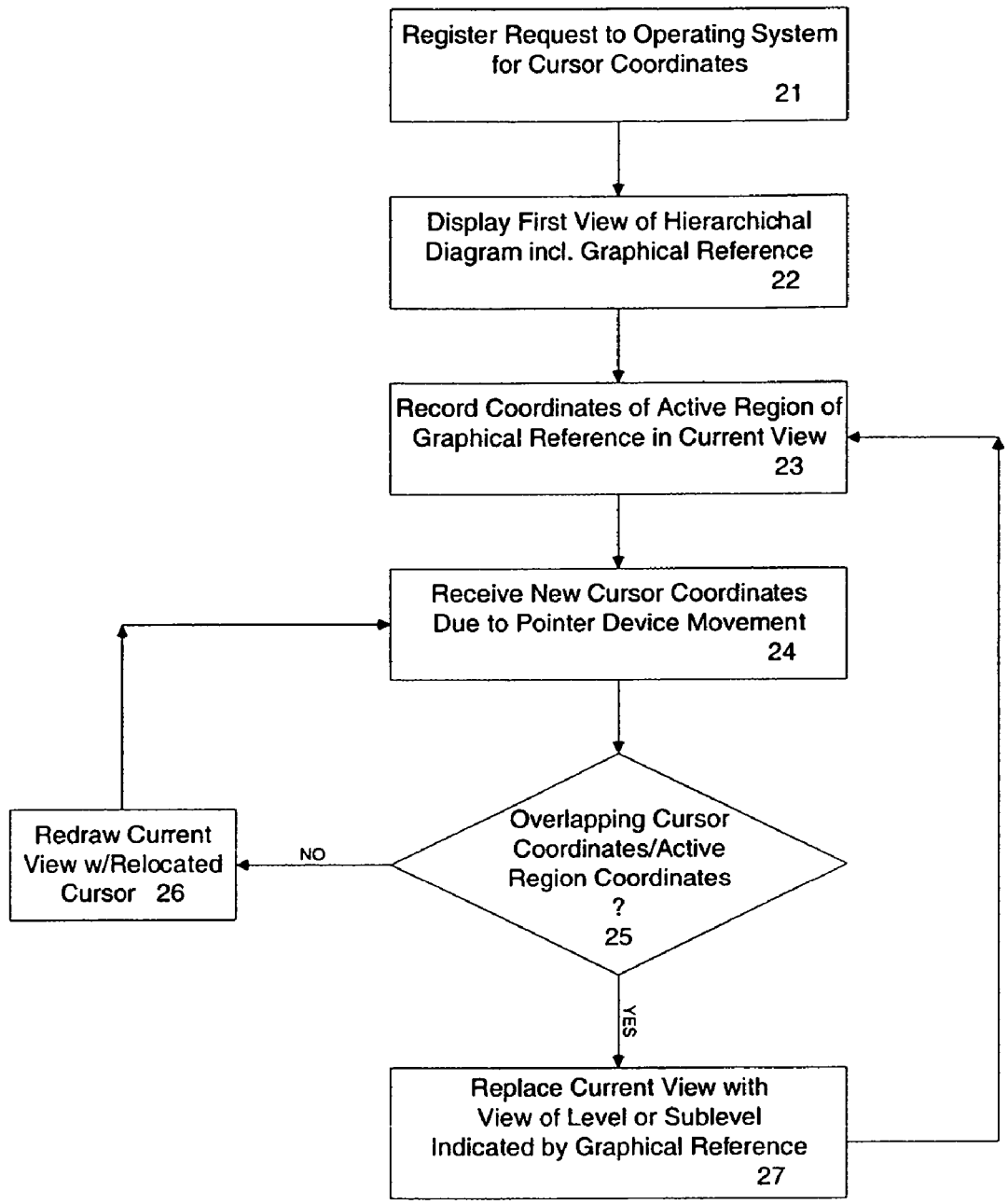
FIG. 4 is a flow chart of the steps followed by an illustrative embodiment to switch views between levels and associated levels or sub-levels.

FIG. 4 shows the steps performed to switch between levels and sub-levels in a hierarchical diagram 16. A request is registered with the operating system 15 of the electronic device 14 for an application 17 that displays the hierarchical diagram 16 to be kept informed of cursor coordinates on the display 1 (step 21). The electronic device 14 displays a first view of a hierarchical diagram level or sub-level that contains a graphical reference to another level or sub-level on the display 1 (step 22). The coordinates of an active region (as defined above) of the graphical reference displayed in the current view are recorded (step 23). The coordinates of the active region are known once the hierarchical diagram is displayed. The next time movement of the pointing device 18 causes the cursor in the display to move, the new cursor coordinates are retrieved (step 24) and compared to the recorded active region coordinates of the graphical reference (step 25). If the coordinates of the cursor associated with the pointing device 18 do not overlap the recorded area of the active region of the graphical reference, the current view displayed in the display 1 is redrawn to account for the new cursor position (step 26) and the method of the present invention waits for the next cursor movement. If the coordinates of the cursor associated with the pointing device 18 do overlap the recorded area of the active region of the graphical reference, the current view displayed in the display 1 is redrawn and the level or sub-level referenced by the graphical reference replaces the view currently displayed in the display 1 (step 27).

Figure 5A:
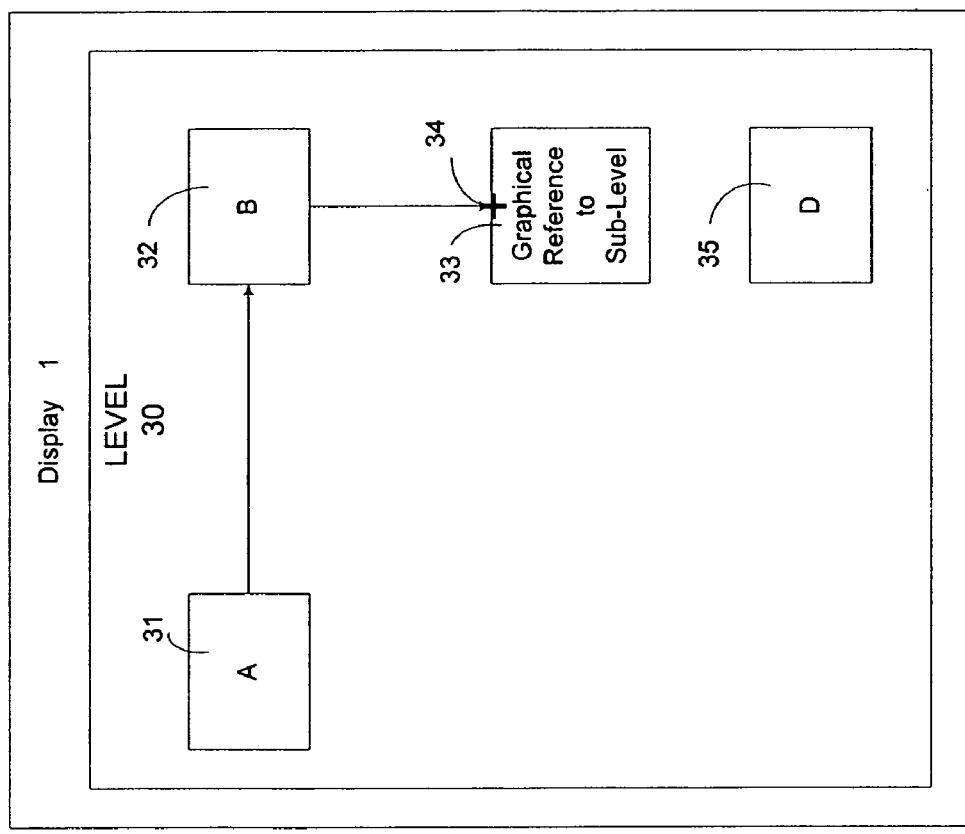
FIG. 5A is a block diagram of an embodiment of the present invention displaying the drawing of connections between a level and a sub-level with a level displayed.
Figure 5B:
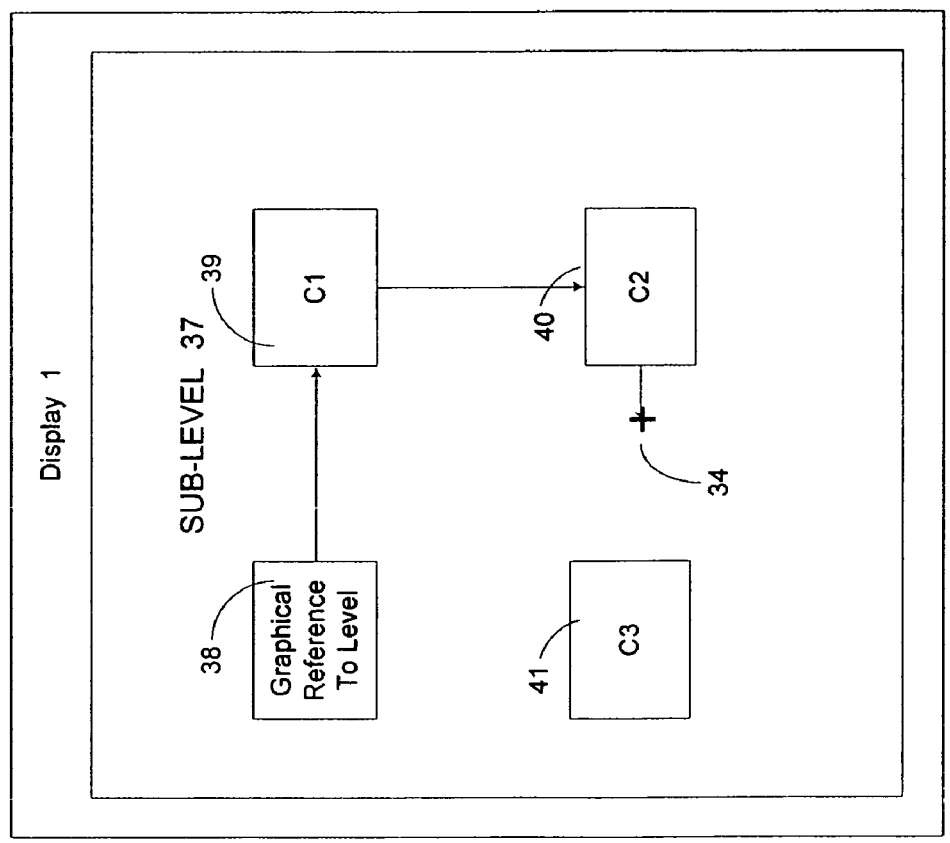
FIG. 5B is a block diagram of an embodiment of the present invention displaying the drawing of connections between a level and a sub-level with a sub-level displayed.

FIGS. 5A and 5B depict an example of the process by which a user manipulating a pointing device 18 may create connections in a displayed hierarchical diagram that extends from a displayed level to an initially non-displayed sub-level. FIG. 5A shows a level of the hierarchical diagram 30 that is displayed on the display 1. The level 30 contains a variety of graphical objects 31, 32, 33, 35, which are also displayed. One of the graphical objects 33 is a graphical reference to a sub-level. A user manipulating a pointing device 18 is able to draw connections between the various graphical objects 31, 32, 33, and 35 displayed on the displayed level 30. For example, the user may perform a drag and drop operation to create connections at the spot of the cursor. The coordinates of the active region within the graphical reference to the sub-level 33 are recorded and continually cross-referenced against the coordinates for the cursor 34. The user manipulates the pointing device 18 so that the cursor 34 draws connections between the various graphical objects displayed on the display 1. The cursor 34 draws a connection between graphical object A 31 and graphical object B 32 and continues the connection in one motion until reaching the graphical reference to sub-level 33. When the cursor coordinates reported by the operating system 15 overlap the recorded coordinates for the active region of the graphical reference to the sub-level 33, the view on the display 1 is switched from the level 30 to the referenced sub-level 37 shown in FIG. 5B.

Figure 6B:
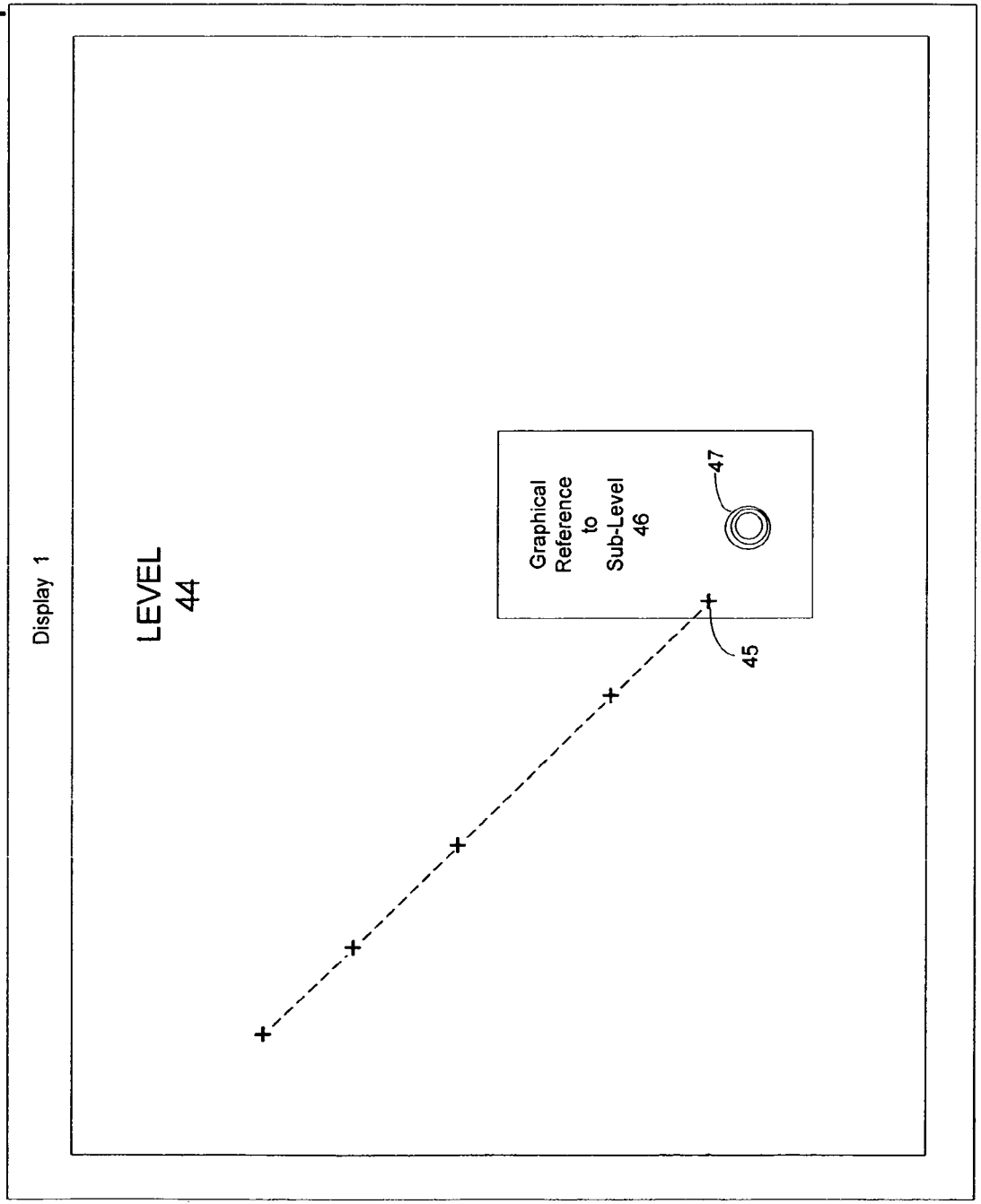
FIG. 6B depicts the block diagram of FIG. 6A also containing a wormhole located in the graphical reference.

FIG. 5B depicts a continuation of the process begun in FIG. 5A. The sub-level 37 contains its own graphical objects 38, 39, 40 and 41. The graphical objects include a graphical reference back to the level 38. The cursor 34 initially appears on the edge of the graphical reference to the level 38 and the user may continue the connection that was started in the level 30 in one uninterrupted motion. The user may continue and draw a connection between the graphical reference to the level 38 and object C1 39 and then object C2 40 all in one motion. Those skilled in the art will recognize that there are a multitude of different ways in which to draw connections between graphical objects on a display 1 depending upon the actual application 17 being used by the user. In one embodiment of the present invention, the user is assisted in finding the active region within the graphical reference to another level or sub-level. As the cursor approaches the graphical reference to the other sub-level (or level) visual keys aid the user in orienting the cursor 34 to the active region. FIGS. 6A through 6C depict this type of visual aid.

FIG. 6A depicts the view of a level 44 displayed on a display 1 containing a graphical reference to a sub-level 46. A cursor 45 is also displayed in the view of the level 44. A user manipulating a pointing device 18 causes the cursor 45 to move across the display 1. Each movement of the cursor is tracked by the operating system 15. The reported coordinates for the cursor 45 are cross-referenced against the recorded coordinates of the graphical reference to the sub-level 46.

FIG. 6B depicts the same displayed level 44 and graphical reference to a sub-level 46 as shown in FIG. 6A. When the cursor coordinates indicate that the cursor 45 is approaching the graphical reference to the sub-level 46, a visual aid, referred to herein as a "wormhole" 47, appears within the graphical reference to the sub-level 46.

FIG. 6C depicts the level displayed in FIG. 6B with the cursor 45 closer to the center of a displayed wormhole 47. The wormhole 47 grows in size as the cursor 45 gets closer to the wormhole as reported by the cursor coordinates. The wormhole 47 includes an active region 48 in the center of the wormhole. When the cursor 45 reaches and overlaps the coordinates of the active region 48, the view displayed in display 1 switches from the displayed level 44 to the sub-level referenced by the graphical reference to the sub-level 46. The cursor 45 then reappears on the newly displayed view of the sub-level. Those skilled in the art will recognize that the navigation technique explored in FIGS. 6A-6C may also be used to draw connections between levels and other levels or sub-levels using the techniques outlined above.

In one embodiment, the wormhole 47 has a minimum radius which is a pre-defined size for the wormhole when it is first displayed to the user. In another embodiment, the wormhole 47 grows in size as the cursor 45 approaches the wormhole, but only to a pre-defined maximum radius size.

As discussed above, in some embodiments of the present invention, a wormhole 47, which includes an active region 48, is used to trigger the replacement of the view in the display 1 when the cursor coordinates overlap the coordinates recorded for the active region. Those skilled in the art will recognize that while the wormhole 47 has been depicted with a circular shape, any sort of two dimensional shape may be utilized. Although the term "radius" has been used to discuss minimum and maximum parameters for the wormhole 47, other units of measurements corresponding to non-circular shapes for the wormhole may be utilized as well.

The dynamic sizing of the wormhole 47 enables the user to more efficiently detect the active region 48 necessary for triggering the display of graphically referenced levels or sub-levels. The wormhole may be programmed to be invisible until such time as the cursor 45 approaches the graphical reference to the sub-level 46. By remaining invisible until the cursor 45 approaches, visible clutter on the display 1 is reduced. In another embodiment of the present invention, an escape parameter may be introduced for the wormhole 47. The escape parameter corresponds to a maximum cursor speed required to trigger the replacement of the displayed level with the referenced sub-level. The maximum cursor speed refers to the speed of the cursor within the area of the recorded active region 48 in the graphical reference to the sub-level 46. If the cursor 45 exceeds the escape parameter while within the active region 48, the view displayed on the display 1 will not change. If the coordinates of the cursor overlap the coordinates of the active region 48 and the cursor is traveling at a speed less than the escape parameter, the referenced sub-level view will replace the level view in the display 1. Thus, by slowing down or speeding up, the user of the pointing device 18 is able to control the replacing of different views in the display 1 even when the cursor path of travel takes it through a graphical reference to a level or sub-level 46. In a different embodiment, the user may be required to keep the mouse within the active region 48 in the graphical reference to the sub-level 46 for a pre-defined period of time before the replacement of the views takes place.

Those skilled in the part will recognize that although the examples contained herein have been made with reference to hierarchical diagrams in general, the method of the present invention is equally applicable to state diagrams, flow charts, the use of block diagram editors, the use of state flow editors, and the use of flow chart drawing applications.

It will thus be seen that the invention attains the objects made apparent from the preceding description. Since certain changes may be made without departing from the scope of the present invention, it is intended that all matter contained in the above description or shown in the accompanying drawings be interpreted as illustrative and not in a literal sense. Practitioners of the art will realize that the system configurations depicted and described herein are examples of multiple possible system configurations that fall within the scope of the current invention. Likewise, the sequence of steps utilized in the illustrated flowcharts are examples and not the exclusive sequence of steps possible within the scope of the present invention.

I claim:

1. A computer-implemented method of navigating a diagram, the method comprising:

displaying a first level of the diagram on a display, the first level including a graphical reference to a second level of the diagram;

automatically displaying the second level when a cursor entering an active region located within the graphical reference to the second level; and navigating to the second level using the cursor, the navigating being part of an operation to modify content of the second level or to modify content of one or more levels accessible through the second level.

2. The method of claim 1 further comprising:
providing a wormhole around the active region, the wormhole being a visual aid displayed in the display which indicates a location of the active region.

3. The method of claim 1 wherein the diagram is a hierarchical diagram.

4. The method of claim 1 further comprising:
modifying content in the first level.

5. The method of claim 1, wherein a line is drawn as the cursor navigates from the first level to the second level.

6. The method of claim 5, further comprising:
connecting an object in the first level with one or more objects in the second level using the line, or
connecting an object in the first level with one or more objects in the one or more levels accessible through the second level using the line.

7. The method of claim 6, wherein the connecting is performed by a drag and drop operation.

8. The method of claim 6, wherein the connecting begins in the first level and continues to the second level in one uninterrupted motion, or the connecting begins in the first level and continues to the one or more levels accessible through the second level in one uninterrupted motion.

9. The method of claim 1, wherein the first level is one of the one or more levels accessible through the second level.

10. The method of claim 1 further comprising:
navigating the diagram via the second level, the second level including a graphical reference to a third level; and
automatically displaying the third level when the cursor enters an active region located within the graphical reference to the third level.

11. The method of claim 1 further comprising:
providing within the second level an active region located within a graphical reference to the first level; and
automatically displaying the first level in response to the cursor navigating to the active region of the graphical reference to the first level.

12. A computer-readable medium holding computer-executable instructions for causing a computing device to navigate a diagram, the medium holding one or more instructions for:
displaying a first level of the diagram on a display, the first level including a graphical reference to a second level of the diagram;
automatically displaying the second level when a cursor entering an active region located within the graphical reference to the second level; and
navigating to the second level using the cursor, the navigating being part of an operation to modify content of the second level or to modify content of the one or more levels accessible through the second level.

13. The medium of claim 12 further comprising:
instructions for providing a wormhole around the active region, the wormhole being a visual aid that indicates the location of the active region.

14. The medium of claim 12 further comprising:
instructions for modifying content in the first level.

15. The medium of claim 12 further comprising:
instructions for drawing a line between a first object in the first level and a second object in the second level or in the one or more levels accessible through the second level as the cursor navigates from the first level to the second level or the one or more levels accessible through the second level.

16. The medium of claim 15, wherein the connection between the first object and the second object is performed by a drag and drop operation.

17. The medium of claim 12, wherein the diagram is a hierarchical diagram.

18. The medium of claim 12, wherein the first level is one of the one or more levels accessible through the second level.

19. The medium of claim 12 further comprising one or more instructions for:
navigating the diagram in the second level, the second level including a graphical reference to a third level; and
upon the cursor entering an active region located within the graphical reference to the third level, automatically displaying the third level.

20. The medium of claim 12 further comprising instructions for:
providing within the second level an active region located within a graphical reference to the first level; and
automatically displaying the first level in response to the cursor navigating to the active region of the graphical reference to the first level.

21. A system for navigating and modifying a diagram, said system comprising:
a display to:
display a diagram; and
a processor to:
execute instructions for an application for displaying and editing of the diagram, the application displaying a first level of the diagram on a display, the first level including a graphical reference to a second level,
execute instructions for automatically displaying the second level, and
execute instructions for navigating to the second level using the cursor, the navigating being part of an operation to modify content of the second level or one or more levels accessible through the second level.

22. The system of claim 21, wherein the diagram includes a wormhole around the active region within the graphical reference to the second level, the wormhole being a visual aid that indicates the location of the active region within the graphical reference to the second level.

23. The system of claim 21, wherein the display of the diagram further comprises a displayed line connecting a first object in the first level with a second object in the second level or the one or more levels accessible through the second level.

24. The system of claim 21, wherein the diagram includes an active region in the second level with a graphical reference to the first level and the first level is included in the one or more levels accessible through the second level.

25. The system of claim 21, wherein the diagram is a hierarchical diagram.

* * * * *

UNITED STATES PATENT AND TRADEMARK OFFICE
CERTIFICATE OF CORRECTION

PATENT NO. : 7,555,731 B2  Page 1 of 1
APPLICATION NO. : 11/359342
DATED : June 30, 2009
INVENTOR(S) : Jay Ryan Torgerson It is certified that error appears in the above-identified patent and that said Letters Patent is hereby corrected as shown below:

Column 2, Line 28, "postion," should be --position--.

Signed and Sealed this

Eighteenth Day of August, 2009

David J. Kappos
*Director of the United States Patent and Trademark Office*